United States Patent [19]

John et al.

[11] Patent Number: 4,908,884

[45] Date of Patent: Mar. 20, 1990

[54] FLEXIBLE DRAIN

[75] Inventors: Scott E. John, Bryan; Jeffrey L. Miller, Pioneer, both of Ohio

[73] Assignee: The Aro Corporation, Bryan, Ohio

[21] Appl. No.: 245,705

[22] Filed: Sep. 19, 1988

[51] Int. Cl.[4] .......................... F16K 31/00; A47K 1/14
[52] U.S. Cl. ........................................... 4/295; 4/286; 251/349; 251/342
[58] Field of Search ................... 4/295, 286, 204, 205, 4/213; 222/519, 520, 521; 251/349, 341, 342, 339

[56] References Cited

U.S. PATENT DOCUMENTS

| | | | |
|---|---|---|---|
| 2,729,368 | 1/1956 | Lapin et al. | 251/349 |
| 2,739,841 | 3/1956 | Soffer | 251/349 |
| 2,829,806 | 4/1958 | Tedaldi | 251/349 |
| 4,079,744 | 3/1978 | Franson et al. | 251/342 |
| 4,171,074 | 10/1979 | Diamond | 251/349 |
| 4,254,794 | 3/1981 | Smith | 137/448 |

OTHER PUBLICATIONS

"Wilkerson Advertisement" For Flex-Drain Product.

Primary Examiner—Henry J. Recla
Assistant Examiner—Edward C. Donovan
Attorney, Agent, or Firm—Allegretti & Witcoff, Ltd.

[57] ABSTRACT

A flexible filter drain is disclosed. The drain has a flexible body, a sealing washer, and a rigid brass drain stem with a sealing lip contacting the upper end of the body. The drain stem is held in sealing engagement with the flexible body by means of the cooperative action of an internal stem rib in the body and a rib member on the stem interlocking with the stem rib biased by the upper sealing lip on the stem cooperating with the upper surface of the body. A drain groove in the body provides fluid and contaminant flow through the drain when the lower party of the body and stem are displaced from axial alignment.

2 Claims, 1 Drawing Sheet

FLEXIBLE DRAIN

BACKGROUND OF THE INVENTION

This invention relates to flexible drains of the type used to drain filter and lubricator bowls.

Certain types of filtration and lubrication devices consist of cartridge type filters in an air or lubricant supply line. These filters frequently consist of a removable filter cartridge within a filter container. The filter container frequently has two components: a cap secured in the air or lubricant supply line, and a bowl removably securing the filter within the cap.

After filtration by the cartridge filter, contaminants settle at the bottom of the bowl. The contaminants must be drained from the bottom of the bowl intermittently to allow the filter to operate effectively. The problem is to provide a drain that reliably seals the bowl when not draining and yet allows an operator to quickly drain the bowl without removing the bowl and with minimum effort whenever desired, and even when the filter is located is very difficult to reach areas.

One type of bowl drain known in the art is a flexible drain. The flexible drain penetrates the bottom of the bowl and includes an internal valve that drains the bowl when the flexible drain is pushed sideways, off of its free state vertical axis. Wilkerson Corporation of Englewood, Colorado makes such a product known as a FLEX-DRAIN. It includes rubber tube passage from the bottom of the bowl with a brass valve member positioned in the passage. The valve member is comprised of spaced disc members connected by an axial stem. One disc seals against one end of the rubber tube passage. The other disc engages the side walls of the passage to insure axial alignment. Squeezing and flexing the tube opens the passage.

A problem with these prior art flexible drains is that, although they may effectively drain the bowls, they do not effectively maintain a seal when the filter is in use. Especially when the pressure within the bowl is low, such as between 0 and 15 p.s.i., the valves in the prior art flex drains after are not closed effectively enough to provide a secure seal at all times when not being used to drain the bowls.

It is thus an object of the present invention to provide a flexible drain that effectively seals filter bowls even at low pressures.

Yet another object is to provide such a drain that is economical and easy to use.

A further object is to provide a flexible drain consisting of a minimum number of components: a flexible drain body, a rigid valve, and additionally but not necessarily, a sealing washer.

An additional object is to provide such a flexible drain that is easily replaceable as the old flexible drain becomes worn or fatigued through use.

There are further objects and advantages that will become apparent as the specification proceeds.

SUMMARY OF THE INVENTION

The foregoing and other objects are attained by our invention of a flexible drain body cooperative with a relatively rigid drain stem of special construction secured within the body. The body has an upper sealing end penetrating the bowl, a lower flexible draining end opposite the sealing end, a drain passage passing the length of the body, a circumferential drain stem rib extending inwardly from the inner periphery of the drain passage, and an axial drain groove defined in the inner periphery of the drain passage. The drain stem has an upper sealing lip disc or flange adapted to sealingly engage or seat on the upper periphery of the upper sealing end of the drain body and an elongate stem extending from the disc terminating with a ramming shaft end penetrating the drain passage. A wedge shaped rib member extends radially outwardly from the stem and an intermediate section connects the sealing disc to the rib member. The upper end or land of the rib member normally engages the lower surface of the rib in the passage, and effects axial alignment of the stem in the passage since the distance between the drain stem rib member and disc is somewhat less than the distance between the upper seat and rib of the flexible body.

The drain stem rib member thus constantly urges the upper sealing disc downwardly into sealing engagement with the seat of the drain body. When the stem is axially displaced, the body flexes causing the disc to unseat and contaminants to flow through the drain groove past the rib member and out the drain passage.

BRIEF DESCRIPTION OF THE DRAWINGS

The preferred embodiment of the present invention is depicted in the drawings wherein.

DESCRIPTION OF THE PREFERRED EMBODIMENT

Figure 1:
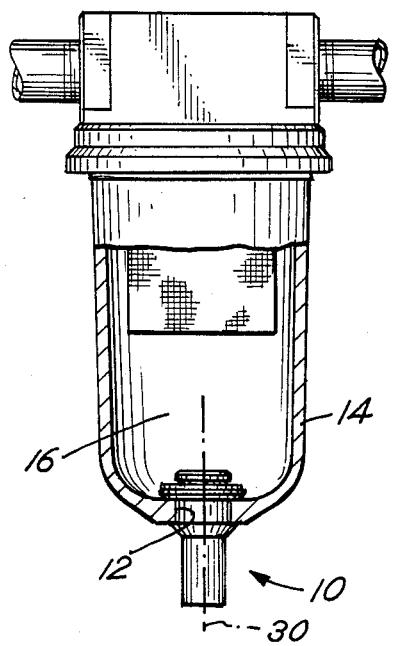
FIG. 1 is a side, partial cutaway view of a cartridge filter showing the cartridge within the in-line filter casing and the preferred embodiment of the present invention secured within the bottom of the bowl.

Referring to FIG. 1, the flexible drain construction 10 of the present invention is sealingly secured within a drain passage 12 at the bottom of a filter bowl 14. The flexible drain 10 is comprised of an elastomeric body 20 which maintains a secure seal between the internal area 16 within the bowl 14 and its surrounding environment.

Figure 2:
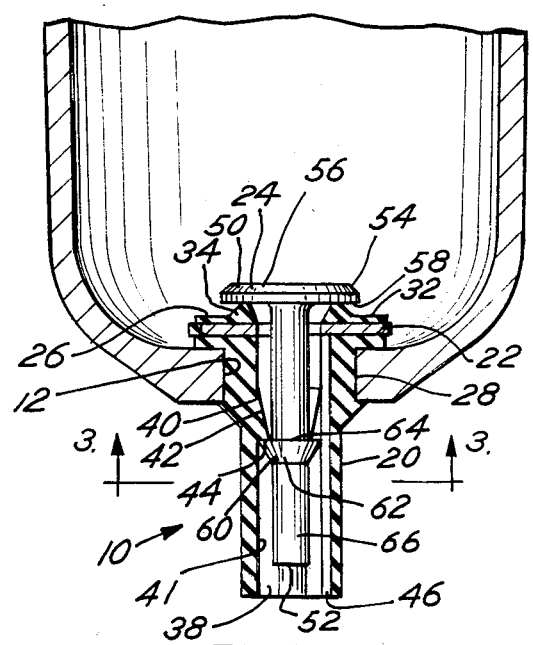
FIG. 2 is a partial cross-sectional plan view of the preferred embodiment secured within the bowl in its sealing, non-draining state.

Referring to FIG. 2, the drain construction 10 has three principal components: (i) a flexible, elastomeric, sealing drain body 20, (ii) a rigid sealing washer 22 molded into the drain body 20, and (iii) a rigid drain stem 24 penetrating the body 20. The drain body 20 has an upper sealing end 26. The upper sealing end 26 has a circumferential groove 28 which is sized to cooperate with and sealingly engage passage 12. Thus, the bowl seal groove 28 is sealingly engaged with the periphery of drain passage 12 in the bottom of the bowl 14.

The upper sealing end 26 also has an upper sealing flange 32 sealingly abutting the inner periphery of the bottom of the bowl 14. A sealing lip seat 34 extends upwardly from the upper surface of the upper sealing end 26 at a constant radial distance from the longitudinal axis 30 of the drain body 20.

The drain body 20 also has a lower draining end 36 opposite its upper sealing end 26. A substantially tubular drain passage 38 extends the entire axial length of the drain body 20 from the upper sealing end 26 through the lower draining end 36 of the body 20.

Four equally, circumferentially spaced drain stem ribs 40 extend radially inwardly from the internal surface 42 of the generally constant diameter of the drain passage 38. Each drain stem rib 40 has a radially outwardly sloping upper surface 42 abutting a radially planar lower surface 44 that lies in a plane perpendicular to axis 30. Each surface 44 of each rib 40 is coplanar.

A radially outwardly extending drain groove 46 is defined in the inner surface 42 of the drain passage 38 along its axial length except that groove 46 does not extend through seat 34. The drain groove 46 does, however, extend axially between ribs 40 to provide a path for fluid and contaminant flow past the ribs 40.

The drain stem 24 is a rigid element preferably made of brass 24. The drain stem 24 has an upper sealing lip flange or disc 50 mounted on a shaft or stem 52 extending axially from the flange 50. The flange 50 has an outer circumferential edge 54 having a diameter substantially greater than the diameter of the sealing lip seat 34 on the upper sealing end 26 of the body 20. The flange 50 has a planar upper surface 56 and a planar lower surface 58. The planar lower surface 58 is thus adapted to sealingly abut the seat 34 of the body 20.

The shaft or stem 52 has a radially outwardly extending circumferential rib member 60. The rib member 60 is frustoconically shaped and includes a radially inwardly sloping lower surface 62 intersecting a planar radially extending land surface 64. Surface 64 is perpendicular to the longitudinal axis of stem 52. The axial distance between the land 64 and the planar lower surface 58 of the drain stem 24 is somewhat less than the axial distance between the planar lower surface 44 of the drain stem rib member 40 and the upper crest of the seat 34.

A section 66 of the shaft 52 extends downwardly from the rib 60. The section 66 of shaft or stem 52 has a diameter substantially less than the internal diameter of the lowermost portion of the drain passage 38 extending downwardly from the drain stem ribs 40 in the drain passage 38. Similarly, the diameter of the central portion of the stem 52 intermediate the disc 50 and the rib member 60 is substantially less than the internal diameter of the uppermost portion of the drain passage 38 extending upwardly from the drain stem ribs 40 in the drain passage 38.

Figure 3:
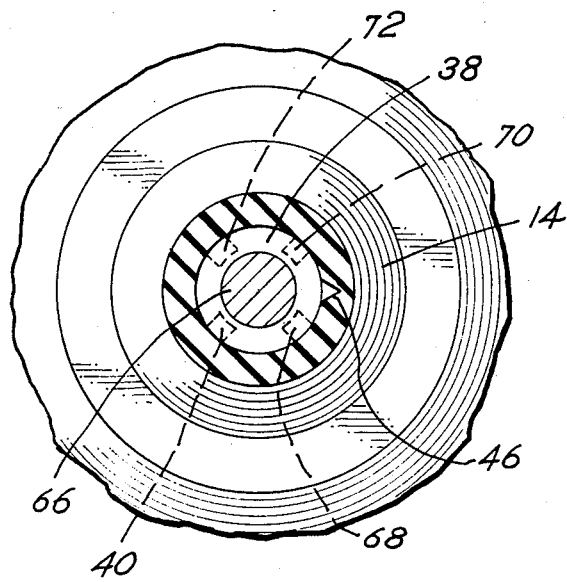
FIG. 3 is a bottom cross-sectional view, taken along section line 2—2 of FIG. 2, of the preferred embodiment secured within the bowl and showing the orientation of the internal drain stem wedges and drain groove of the flexible drain body.

Referring now to FIG. 3, the four drain stem ribs 40 are spaced apart from each other around the internal periphery surface 42 of the drain passage 38. The drain groove 46 penetrates the drain passage 38 intermediate two opposing stem ribs 40.

With reference back to FIG. 2, the sealing washer 22 is retained in the sealing end 26 of the body 20 intermediate the upper seat 34 and the bowl seal groove 28 in the body 20. The sealing washer 22 adds rigidity to the flexible body 20 adjacent the junction of the bowl seal groove 28 and the upper sealing lip wedge 34. In this manner, (i) the bowl seal groove 28 maintains sealing engagement with the drain passage 30 and (ii) the upper sealing lip wedge 34 retains its planar orientation with respect to the drain passage 30 even as the lower draining end 36 and stem 52 are forcibly deformed off-axis 30.

Figure 4:
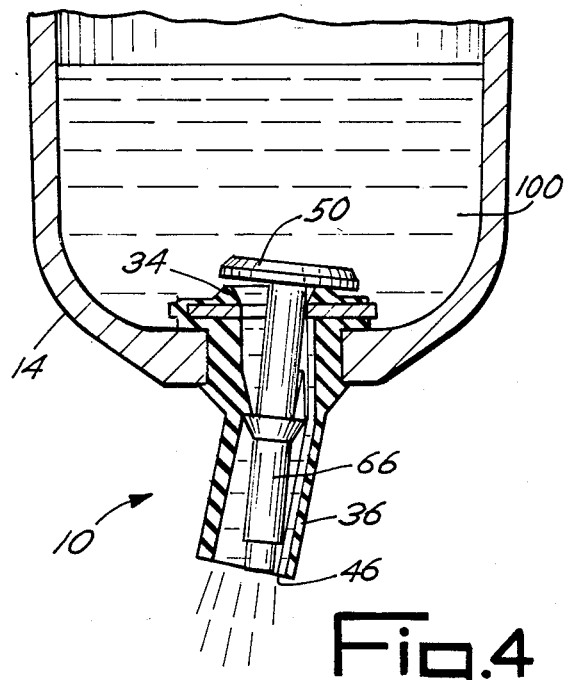
FIG. 4 is a partial cross-sectional plan view of the preferred embodiment secured within the bowl in the non-sealing, draining state.

Referring now to FIG. 4, when the lower draining end 36 and stem 52 are manually or otherwise moved off axis 30, the upper lip flange 50 on the drain stem 52 is forced to tip off-axis 30 and out of sealing contact with the relatively rigid and immobile upper seat 34. Fluid and contaminants 100 collected in the bowl thus drain downward into the drain passage 38, through the continuously open drain groove 46, past the section 66, and out the bottom end of the drain body 20. Release of the force against shaft 52 permits the elastomeric forces associated with the body 20 to force the stem 24 automatically back into axial alignment. Flange 50 then is again in sealing engagement with the seat 34.

It can thus be seen that the preferred embodiment provides an economical, safe, easy to use, and securely self-sealing flexible drain 10. The self-sealing feature provide by the cooperation of interlocking rib 40 and rib member 60 maintains a secure seal even when pressures in the filter drop down to 0–15 p.s.i. In addition, the components are relatively easily assembled, and once assembled remain securely together and in place with respect to each other and the filter bowl.

The foregoing is a detailed description of the preferred embodiment and is thus illustrative. The scope of the invention is set forth in the following claims.

What is claimed is:

1. An improved flexible drain of the type used to drain filter or lubricating bowls having drain passages passing through the lower portion of the bowl, the improved flexible drain comprising:
    (a) a flexible drain body having:
        (1) a drain passage having an upper passage end communicating with the upper sealing end and a lower passage end communicating with the lower draining end of the drain body;
        (2) said sealing end with an upper sealing surface and an intermediate periphery adapted to sealingly penetrate the drain passage in the bowl;
        (3) said lower draining end opposite the drain seal end;
        (4) said flexible drain body containing a thickened uppermost portion and a thinner lowermost portion;
        (5) a drain body rib extending inwardly from the inner periphery of the drain passage intermediate the upper sealing and lower draining ends, said rib having a radially outwardly sloping upper surface abutting a radially planar lower surface, said lower surface lying in a plane perpendicular to the axis of the drain body, said rib being located within the thickened uppermost portion of the drain body,
        (6) a drain groove in the inner periphery of the drain passage along its axial length; and
    (b) a rigid drain stem having;
        (1) an upper sealing lip flange adapted to sealingly engage the upper periphery of the upper sealing end of the body;
        (2) a ramming shaft extending from the sealing lip flange axially in the passage and being substantially narrower than the diameter of the drain passage;
        (3) a rib member extending radially outwardly from the ramming shaft, said rib member being frustoconically shaped and including a radially inwardly sloping lower surface intersecting a planar radially extending upper surface, and said rib member being a solid and unitary component of said drain stem and located on said drain stem intermediate the upper sealing and lower draining ends of said drain stem, the upper surface defining a circumferential land for locking engagement with said lower surface of said drain body rib.

(4) an intermediate section connecting the sealing lip to the rib member whereby when the upper land of the rib member engages the lower surface of the drain body rib, the sealing lip sealing abuts the sealing end of the drain body; the distance between the upper sealing surface and the lower edge of the drain body rib being slightly greater than the distance between the underside of the upper sealing lip and upper circumferential edge of the rib member on the drain stem, whereby the stem is normally maintained in axial alignment in the passage and is manually displaceable to permit fluid and contaminant flow on the drain groove.

2. The improved flexible drain of claim 1 wherein the sealing end of the drain body has:

(a) a seat extending upwardly from the sealing end to sealingly abut the lowermost side of the sealing flange; and (b) means for rigidly securing the sealing end in a bowl.

* * * * *